Oct. 31, 1961     D. R. WELLS     3,006,251

REFLECTING SIGNAL FOR AIRCRAFT

Filed July 21, 1958     2 Sheets-Sheet 1

Daniel R. Wells
INVENTOR.

United States Patent Office 3,006,251
Patented Oct. 31, 1961

3,006,251
REFLECTING SIGNAL FOR AIRCRAFT
Daniel R. Wells, Washington, N.J.
(Rte. 1, Hackettstown, N.J.)
Filed July 21, 1958, Ser. No. 749,815
9 Claims. (Cl. 88—81)

This invention relates to signal devices and particularly to a reflective signal for aircraft.

An object of the invention is to make possible the easy detection of aircraft in flight in order to avoid mid-air collisions.

The invention is embodied in a polyhedron having reflective surfaces from which light is reflected in many directions. This light can be either sun light, a lamp or other source of artificial illumination or a combination of both.

It is preferred that the reflective device, made of the polyhedron, be mounted adjacent to a reflector so that the reflected light is reinforced at least by that part of the reflected light which would ordinarily be directed in the general direction of the aircraft. The last named light will strike the reflective surface, and be reflected away from the aircraft.

A further object of the invention is to provide a light reflective signal device for an aircraft wherein the signal device uses the light energy from the sun or an artificial light source, reflecting the light in many directions to facilitate detection of an aircraft in flight. Further, an important feature of the invention is the manner of mounting the reflective device. A spring or an equivalent resilient element supports the reflective device so that it can rotate and shimmer due to the vibrations, movements and oscillations of the airplane in flight. This further aids in making the aircraft in flight easily detectable since the reflected light takes undetermined irregular paths of travel, movements and courses.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

In the accompanying drawing there is a conventional aircraft 10 having a fuselage 12, this being one possible place on which signal 14 can be mounted. The signal 14 is shown approximately on the top and along the center line of the airplane, but it can be mounted in any suitable location, and moreover, the device may be formed in pairs or other numerical multiples and located at various positions on the same aircraft.

Figure 3:
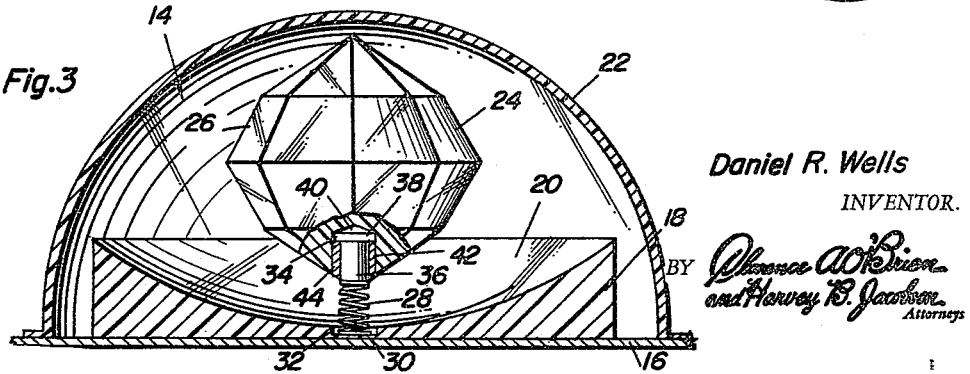
FIGURE 3 is a sectional view taken on the line 3—3 of FIGURE 2.

Signal device 14 has a base 16 adapted to be secured to the airplane and on which mirror 18 is fastened. The mirror is preferably made of lightweight plastic, for example an epoxy resin or some other synthetic resinous material on which a light reflective surface 20 can be made to adhere. The light reflective surface 20 of FIGURE 3 is adhered to the parabolic upper face of the mirror body by a standard procedure, such as electro-deposition, sputtering, evaporation, etc., and is preferably made of a shiny metal. A transparent canopy 22 is attached to base 16, covering mirror 18 and reflective device 24 located within the canopy.

Reflective device 24 is a polyhedron having 32 sides, although the number of sides can be increased or decreased. Here again, the reflective device is preferably, but not necessarily, made of strong plastic, such as epoxy resin, and each facet 26 thereof is coated with a highly reflective material, for example a light metal. The facets can be slightly convex or can be planar. The same holds true for mirror 18 which has been described as parabolic. This can be of other shapes including planar.

There are means mounting the reflective device 24 above surface 20 of mirror 18. These means consist preferably of a spring 28 having one end 30 attached to the center of reflective surface 20 by any type of fastener. A small well 32 can be made in the body of the mirror 18 to accommodate one end of spring 28. The opposite end of the spring 28 has a swivel 34 so that the polyhedron can rotate about the longitudinal axis of the spring. The illustrated swivel merely exemplifies one possible type of swivel and consists of a shank 36 having a head 38 at its upper end. The lower end of the shank is secured to spring 28. Socket 40 is formed in the body of the reflective device 24, and head 38 is held captive therein by bushing 42 which is pressed or otherwise fastened in passage 44 formed in the polyhedron reflective device 24. As a result, the reflective device can rotate about shank 36, and the reflective device can shake with spring 28 yielding and deflecting laterally in response to vibrations and oscillations in the airplane.

Device 24 could be mounted for mechanical rotation about its axis while at the same time the axis of rotation is inclined to the principal plane of the aircraft, and is rotated about an axis perpendicular to the principal plane of the aircraft. Both rotations can be produced by vacuum motors driven by a venturi, electric motors or other suitable means. This form is illustrated in FIGURE 4.

Figure 4:
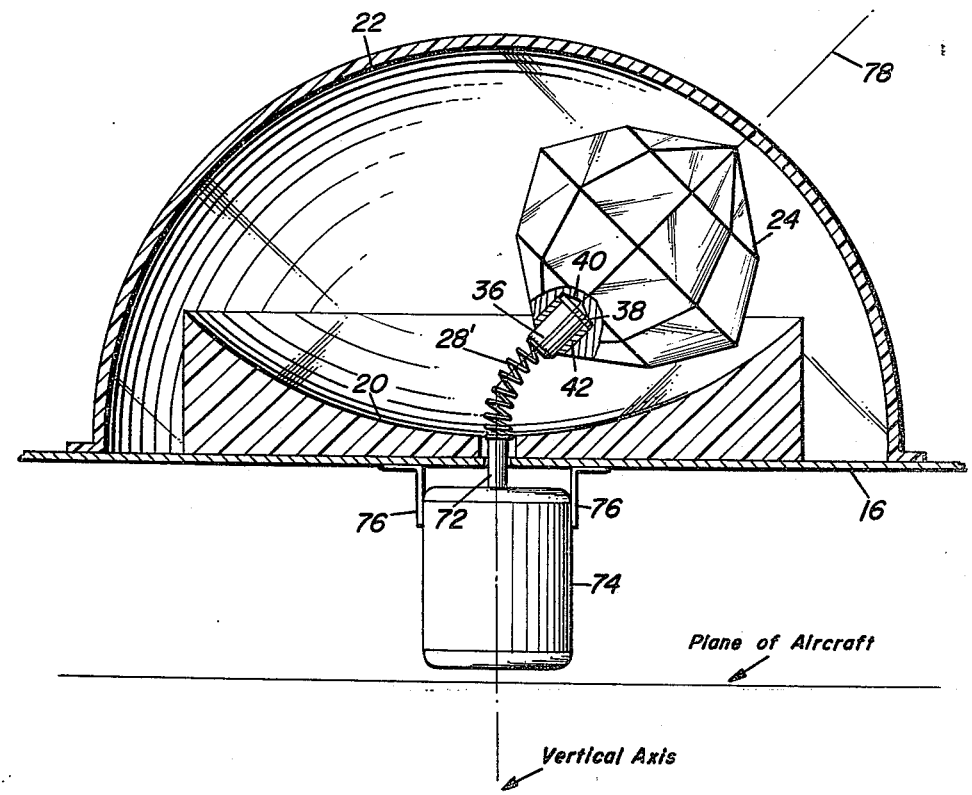
FIGURE 4 is a sectional view similar to FIGURE 3 but showing a modification.

The device or modification shown in FIGURE 4 is quite similar to that form of the invention shown in FIGURE 3, however, certain changes have been incorporated. Most of the parts comprising the modification are identical to the parts comprising the form shown in FIGURE 3 and therefore have been given the same reference numbers. As shown in FIGURE 4, the polyhedron 24 is enclosed by the reflector 20 and transparent canopy 22 in the same manner as illustrated in FIGURE 3, and it is also mounted on a cylindrical shank 36 which is fixed to rotate with the motor shaft 72 of motor 74 by means of the resilient member 28'. The sleeve 42 is secured within a cylindrical bore in the polyhedron 24 for rotatably mounting it on the member 36. The head 38 is secured to the upper end of the shank 36 so as to engage the upper end of the sleeve or bushing 42 for retaining the polyhedron on the shank 36. As indicated in FIGURE 4, the motor shaft 72 extends upwardly in a substantially vertical direction perpendicular to the plane of the aircraft which would normally be horizontal. The motor 74 is connected to the lower surface of the base 16 by means of a plurality of angular brackets 76 which may be welded to the base and the motor. The base 16 may comprise the skin or covering of the aircraft. The motor 72 may be connected to the member 36 by a coil spring 28' or a solid shaft portion if so desired. However, while the axis of the shaft 72 is normal to the plane of the aircraft and therefore would normally be extending in a vertical direction, the member 28' is bent so as to support the member 36 on an axis inclined to the plane of the aircraft. Since the axis of the member 36 coincides with the axis of the polyhedron 24, it is apparent that as the polyhedron rotates about the member 36 it rotates on an axis inclined to the plane of the aircraft, and while it is rotating about the vertical axis of shaft 72, it is rotating about an axis substantially perpendicular to the plane of the aircraft. The polyhedron will rotate about the axis of member 36 due to the frictional drive between the member 36 and sleeve 42, vibrations, and possibly air turbulence within the housing 22.

By having the polyhedron 24 rotate about two axes at the same time, its reflective surfaces will reflect light more rapidly in more different directions, and is therefore more likely to be seen by the crew in other aircraft in the vicinity of the aircraft carrying the polyhedron.

Figure 1:
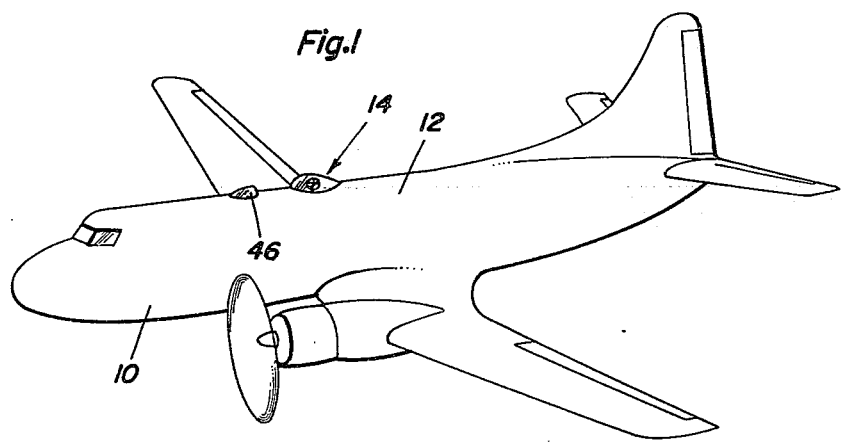
FIGURE 1 is a perspective view showing an airplane in flight and fitted with a signal exemplifying the invention.
Figure 2:
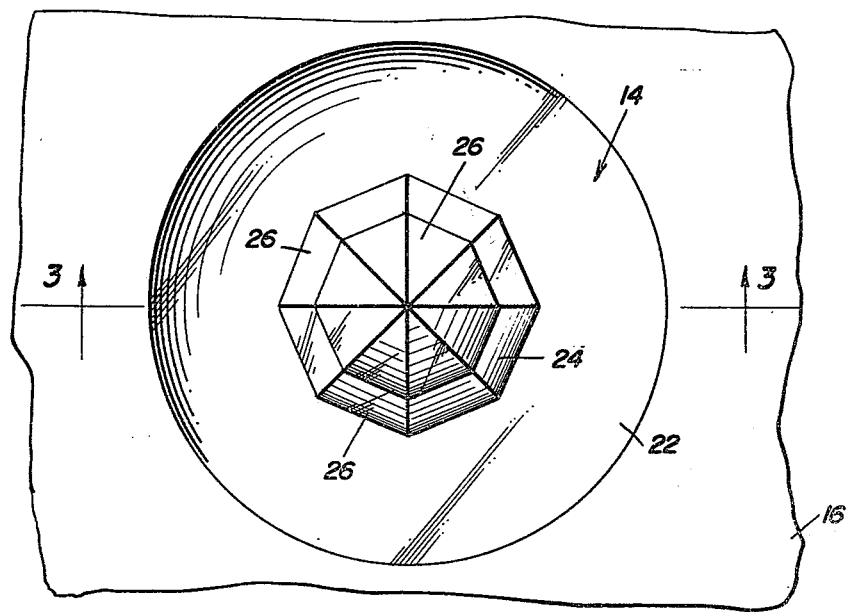
FIGURE 2 is a top view of the signal in FIGURE 1, the light source omitted.

The transparent housing 22, the polyhedron 24, and the mirror 20 in the form shown in FIGURE 4 are identical to these same parts used in the form shown in FIGURES 1 through 3.

As explained above, the motor 74 may be operated by a vacuum, electricity or other suitable means.

In use, the device is mounted on an airplane as described. The sun's rays reflect from the facets 26 in many directions, with at least some of the light reflecting from the lower facets to surface 20 of mirror 18, whence the light is directed outwardly from the airplane. The mirror allows multiple reflections to points in space where single reflections will not go, for example when the sun and approaching aircraft are on opposite sides of the reflector. In that case sun rays will be reflected from the mirror to some of the facets and then to the approaching aircraft.

Instead of or in addition to the light from the sun or other natural sources, an artificial light source 46 is shown mounted on the aircraft 10. This artificial light source may be a fixed or rotatable source or may be mounted to orbit about the reflector, and thus one or two sources will send out light beams in many directions. It is preferred that the artificial light source be constructed of a lamp with a reflector to direct a beam of light through canopy 22 and onto the facets 26 or reflective device 24. The use of the signal device with artificial light is, in essence, the same as described in connection with natural light.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A reflecting signal for an aircraft to facilitate detection of the aircraft while in flight and exposed to the sun rays, said reflecting signal comprising a polyhedron having a plurality of facets with light reflective surfaces to reflect the sun rays, a swivel mounting said polyhedron on a part of the aircraft for rotational movement and a spring connected with the swivel, a mounting base attached to one end of said spring, means securing the other end of said spring to said reflective device whereby said reflective device shakes in response to vibrations of the aircraft, and a mirror located between said base and said light reflecting device so that at least some of the light rays reflected from said device impinge on the surface of said mirror and are directed outwardly from the aircraft in many directions.

2. In combination with an aircraft, a reflective signal for the aircraft to facilitate detection of the aircraft while in flight, said reflecting signal comprising a polyhedron having a plurality of facets with light reflective surfaces, means for mounting said polyhedron on a part of the aircraft for rotation and in position for said surfaces to reflect the sun rays, a source of artificial light carried by the same aircraft and arranged to direct light rays onto said reflective device, a mirror having a surface confronting the facets of said reflective device to further direct the light so that it is reflected from said reflective device in a multiplicity of directions and resilient means connecting said polyhedron to said mirror for permitting relative rotation and oscillation therebetween.

3. The combination defined in claim 2 wherein the signal and light are mounted adjacent one another atop the aircraft fuselage whereby the light therefrom may be seen in any direction.

4. The combination defined in claim 3 wherein the polyhedron and mirror are protected by a transparent canopy and are composed of lightweight plastic covered with a highly reflective material.

5. The combination defined in claim 3 wherein the surface of the mirror is substantially horizontal and the polyhedron is centered directly above the mirror whereby it may be viewed in substantially any direction.

6. A device as recited in claim 2 wherein the polyhedron is driven by power means to also rotate about an axis inclined to the axis of the polyhedron.

7. A device as recited in claim 2 wherein said means for mounting said polyhedron for rotation includes said resilient means, said resilient means extending upwardly from said aircraft and rotatable about a generally vertical axis, the upper end of said resilient means being canted and rotatably supporting said polyhedron for rotation about an axis inclined to said vertical axis, and power means connected to the lower end of said resilient means for rotatably driving same.

8. A reflecting signal for an aircraft to facilitate detection of the aircraft while in flight and exposed to the sun rays, said reflecting signal comprising a polyhedron having a plurality of facets with light reflective surfaces to reflect the sun rays, a swivel mounting said polyhedron on a part of the aircraft for rotational movement and a support member connected with the swivel, a mounting base attached to one end of said support member, means securing the other end of said support member to said reflective device whereby said reflective device rotates in response to vibrations of the aircraft, and a mirror located between said base and said light reflecting device so that at least some of the light reflected from said device impinges on the surface of said mirror and are directed outwardly from the aircraft in many directions.

9. A device as defined in claim 8 wherein said support member has one portion rotatable on said part about an axis substantially perpendicular to the principal plane of the aircraft and another portion connected with said swivel for rotatably supporting said polyhedron about an inclined axis extending through the axis of the polyhedron.

References Cited in the file of this patent

UNITED STATES PATENTS

| 1,622,958 | McLean | Mar. 29, 1927 |
| 1,795,071 | Beerstecher | Mar. 3, 1931 |
| 2,226,159 | De Hoffmann | Dec. 24, 1940 |

FOREIGN PATENTS

| 2,792 | Australia | of 1931 |
| 487,651 | Germany | Dec. 11, 1929 |